(12) United States Patent
Foard

(10) Patent No.: US 7,180,207 B2
(45) Date of Patent: Feb. 20, 2007

(54) DISTRIBUTED SENSOR AND CONTROL NETWORKING INTERFACE

(75) Inventor: William Williams Foard, Durham, NC (US)

(73) Assignee: Foard Geysen, Inc., Durham, NC (US)

( * ) Notice: Subject to any disclaimer, the term of this patent is extended or adjusted under 35 U.S.C. 154(b) by 0 days.

(21) Appl. No.: 11/002,335

(22) Filed: Dec. 1, 2004

(65) Prior Publication Data

US 2006/0125322 A1   Jun. 15, 2006

(51) Int. Cl.
*B23K 11/24* (2006.01)

(52) U.S. Cl. ....................................................... 307/112
(58) Field of Classification Search ................. 307/112
See application file for complete search history.

(56) References Cited

U.S. PATENT DOCUMENTS

2004/0022325 A1*   2/2004   Staver et al. ................ 375/257

* cited by examiner

*Primary Examiner*—Robert L. DeBeradinis
(74) *Attorney, Agent, or Firm*—Townsend and Townsend and Crew LLP

(57) ABSTRACT

The invention provides systems and methods for a distributed sensor and control networking interface.

12 Claims, 9 Drawing Sheets

US 7,180,207 B2

DISTRIBUTED SENSOR AND CONTROL NETWORKING INTERFACE

FIELD OF THE INVENTION

The present invention relates generally to switching systems and methods. More particularly, the present invention provides a distributed sensor and control networking interface.

BACKGROUND OF THE INVENTION

Distributed sensor and control networks can be implemented based upon any number of different communication interface technologies. In many cases, a tradeoff exists between wiring complexity and interface electronics complexity, with many networking technology implementations requiring microprocessor level complexity at each device.

One technology for communicating with a plurality of remote devices, featuring low complexity in both wiring and device implementation requirements, relies on a switching system where the state of each device is dependent upon the state of an interconnected device, as described in U.S. Pat. No. 5,469,000; Australian Patent No. 643,231; Canadian Patent No. 2,065,373; and European Patent Application No. 0487581A, incorporated by reference herein for all purposes.

BRIEF SUMMARY OF THE INVENTION

The present invention adds significant functional enhancements to existing switching systems. Some, but not all, of these enhancements include controlling multi-level system and device reset conditions; automatically identifying device types and unit identification numbers for devices attached to a switching system, providing a functionality similar to "plug and play" type operation; setting or programming the device type and/or unit identification numbers for a device via the switching system communications bus; adding branching to the wiring configuration or topology of the switching system; providing multi-line input and output interfaces to a device in the switching system, and means for efficiently notifying a system controller of input state changes; communicating via switching system devices to interconnected circuits or devices employing other interface protocols, such as RS-232, RS-422, RS-423, RS-485, J1708, SPI, Microwire, I2C, and the Dallas 1-Wire system; directly interfacing the switching system interface with complex interface devices, such as LCD/VFD/OLED display interfaces; auto-scanning devices, such as keyboards and optical encoders to improve system response, and in some cases reduce device power requirements; directly programming microprocessors and microcontrollers in devices attached to the switching system, without cooperating software executing in the attached devices; and implementing a mixed mode switching system, supporting intermixed master/slave communications between controllers and devices, and supporting peer-to-peer communications between devices as well as between controllers and devices.

DETAILED DESCRIPTION OF THE INVENTION

Figure 1:
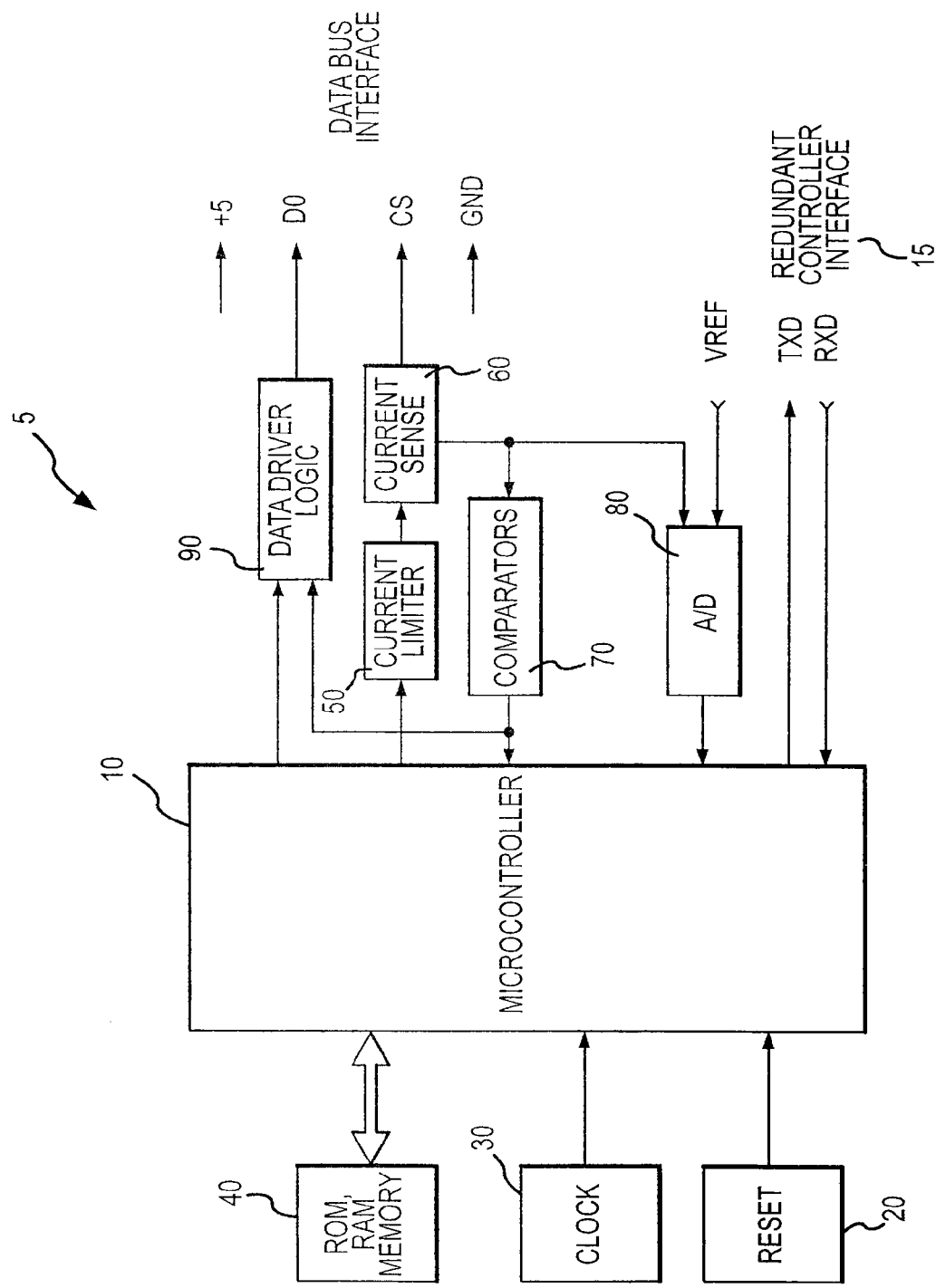
FIG. 1 is a block diagram of one embodiment of a switching system controller in accordance with one aspect of the present invention.

There are many possible implementations of the basic switching system design. In some implementations, additional functionality may be achieved by providing additional state control information from a controller, in addition to a state condition provided to a device by an interconnected device.

In one such implementation, a controller provides a state on the leading edge of a control clocking signal, while the state of the interconnected device is provided on the trailing edge of the clocking signal when device selection state is to be changed. In such a system, the state from the controller during the leading edge of the clocking signal may specify whether a selection state or whether a reset operation occurs. Multiple levels of reset conditions may be achieved by counting the number of reset operations that have been received since the occurrence of the latest selection state operation. For example, a single reset operation sequence might be used to reset the currently selected single device, while a second consecutive reset operation might be used to reset all devices on the system.

Switching system devices may be designed to provide device type and unit identification numbers, which might be used to assist in implementing self-configuring systems. For example, by incorporating a means for retaining device selection history in the device, the device may be designed to provide auto-identification information the first time it is selected after a reset condition, as well as provide sensor state information or otherwise operate in its "normal" condition when subsequently selected.

A device designed to operate in such a manner could, for example, provide auto-identification information on a bit-by-bit basis, during the first selection interval after a system reset, with the state control line from a system controller used to sequentially select or clock out the auto-identification bits.

A switching system, controller and any accompanying devices may be designed such that the combination implements operational phases, where different types of operations and functionality are implemented during each phase. For example, in such a system, the state from the controller during the leading edge can be used to specify whether a selection state or phase state change is to occur, or whether a reset or other clocking type operation is to occur. The action produced upon the trailing edge of the clocking signal could then depend on the operational phase prior to the trailing edge occurrence, in addition to the leading edge and trailing edge signal state conditions.

In such a multi-phase approach, a system may be implemented such that during the first phase after device selection, a device provides for sensor and/or device control communications between the device and a system controller, and during a subsequent operational phase the system controller provides branch steering information to a device. This branch steering information from the controller, along with the state information from an interconnected device, can then be used to determine device selection during a following device selection change operation.

A switching system, controller and any accompanying devices may be designed such that multiple inputs and/or outputs are provided by a single device. For example, while a device is selected and in a proper state for reading a sensor input, transitions on a clock signal line to the device might be used to sequentially select between multiple input signals. Similarly, a clocking signal might be used to select between and/or provide multiple output signals from the device.

Overall system performance may be optimized by including logic in the switching system device implementation when multiple-input devices are used with a switching system. The logic indicates whether or not any input state has changed since last read. With this inclusion, along with indication sent to a controller upon device selection, a system controller determines whether or not time needs to be spent reading each of the multiple input states. If no change has occurred, the controller may proceed to servicing other devices.

A switching system, controller and any accompanying devices may be implemented such that the controller communicates with a microprocessor attached to the switching system device interface logic. Using such a microprocessor based device design, devices can be designed to indirectly bridge to any other interface and/or communications standard. For example, the controller can send a packet to a device, and a microprocessor in that device could retransmit the packet via an Ethernet or modem interface. As a practical matter, this indirect approach implements complex bridge interfaces. However, for suitable interface types, simpler and less expensive bridge devices with lower power requirements may be implemented using a direct interface between the switching system logic and the interface signals. In this manner, a microprocessor is not required to provide the interface bridge functionality.

A switching system, controller and any accompanying devices may be implemented such that a switching system device provides a direct bridging functionality. In this manner, a system controller communicates through a selected device to an attached element using a different, or secondary, protocol. Such a secondary protocol may be a commonly recognized standard interface protocol, such as RS-232, RS-422, RS-423, RS-485, J1708, SPI, Microwire, I2C, or the Dallas 1-Wire interface protocol. Depending upon the complexity of the secondary interface protocol, such an interface might use controller signal states combined with clocking signal transitions, as described above, to control the signal state sequences presented to the secondary interface signal lines.

Similarly, a switching system, controller and any accompanying devices may be implemented such that a switching system device proves a direct bridging functionality. In this manner, a system controller communicates through a selected device to an attached element via an element specific interface, with the particular interface functionality and degree of complexity as needed by the particular attached element. For example, a device may be implemented to interface the switching system to LCD, VFD, or OLED display modules. As another example, a device may be implemented to interface the system to a mechanical rotary encoder with quadrature encoded position signal outputs.

A switching system, controller and any accompanying devices may be implemented such that a switching system device derives a clock signal from a control and/or clocking signals used for system communication. The switching system uses the derived clock signal to scan or control an attached element. This arrangement enables device implementations with minimum additional circuitry and power requirements. For example, the derived clock can be used for scanning a keyboard to watch for key press conditions at the device level, so the system controller will only need to process key changes and not need to continuously scan the keyboard itself. As another example, the derived clock can be used to provide a low duty cycle pulse to power an LED used in an optical encoder, which can reduce the power requirements of the optical encoder.

A switching system, controller and any accompanying devices may be implemented such that a switching system device proves a bridging functionality. In such an implementation, a system controller communicates through a selected device to directly program a microprocessor or microcontroller in the device, without cooperating software executing in the microprocessor in the attached device. For example, a device implementation providing a bridging function to SPI interface signals can be used to program a microprocessor that has an SPI programming interface, such as an Atmel AVR family device. Similarly, some microprocessors or microcontrollers implement I2C programming interfaces, and could be programmed via a switching system device interface which has I2C interface bridge capability.

A switching system, controller and any accompanying devices may be implemented such that master/slave communications between controllers and devices, peer-to-peer communications between devices and peer-to-peer communications between controllers and devices may be intermixed on one system using a single communications bus. One way to implement a switching system with that feature is to implement a system, controller and accompanying devices with a multi-phase operation, as described above. One device selection phase may be used for master/slave mode communication between a system controller and a currently selected sensor or control device. Another operational phase can be used for peer-to-peer communication among capable devices, and between capable devices and a system controller.

FIG. 1 illustrates one embodiment of a switching system controller 5, capable of supporting the features described herein. A microcontroller 10, and the items shown to the left, comprises a typical microprocessor or microcontroller implementation, with a reset circuitry 20, a processor clock 30, and various types of memory 40. It may also have other common microprocessor circuit features, such as an RS-232 interface or other peripheral I/O connections (not shown).

The blocks shown to the right of microcontroller 10 implement the switching system specific functionality. A current limited source is supplied to the CS line, through a current sensing circuit. A current limited source 50 is enabled/disabled by microcontroller 10, providing a clock signal to the connected devices. The current on this line is measured with a current sense circuit 60 to provide a data path from the devices to microcontroller 10, similar to a 4–20 milliamp current loop signal measurement. A comparator 70 provides a digital level measurement of the current level, used for digital signal reception, and an A/D circuit 80 provides an analog to digital conversion of the signal for analog signal reception. Thus, the system may directly support a mix of analog and digital device types.

Microprocessor 10 may provide system controller state signals and digital data communications from a controller to connected devices via a data driver logic 90. During peer-to-peer communications, the received digital data detected by comparator 70 may also be sent out via the data driver logic 90 to connected devices.

A system controller may also include a redundant controller interface 15 to provide a communications link to at least one other system controller that might be present in a switching system. Such an arrangement provides redundancy for implementing fail-safe system operation. The system controllers may periodically talk to one another to ensure that they are functioning properly. One or the other may take control of the system to maintain proper system operation, and report the system controller failure to the user so repairs can be made.

Figure 2:
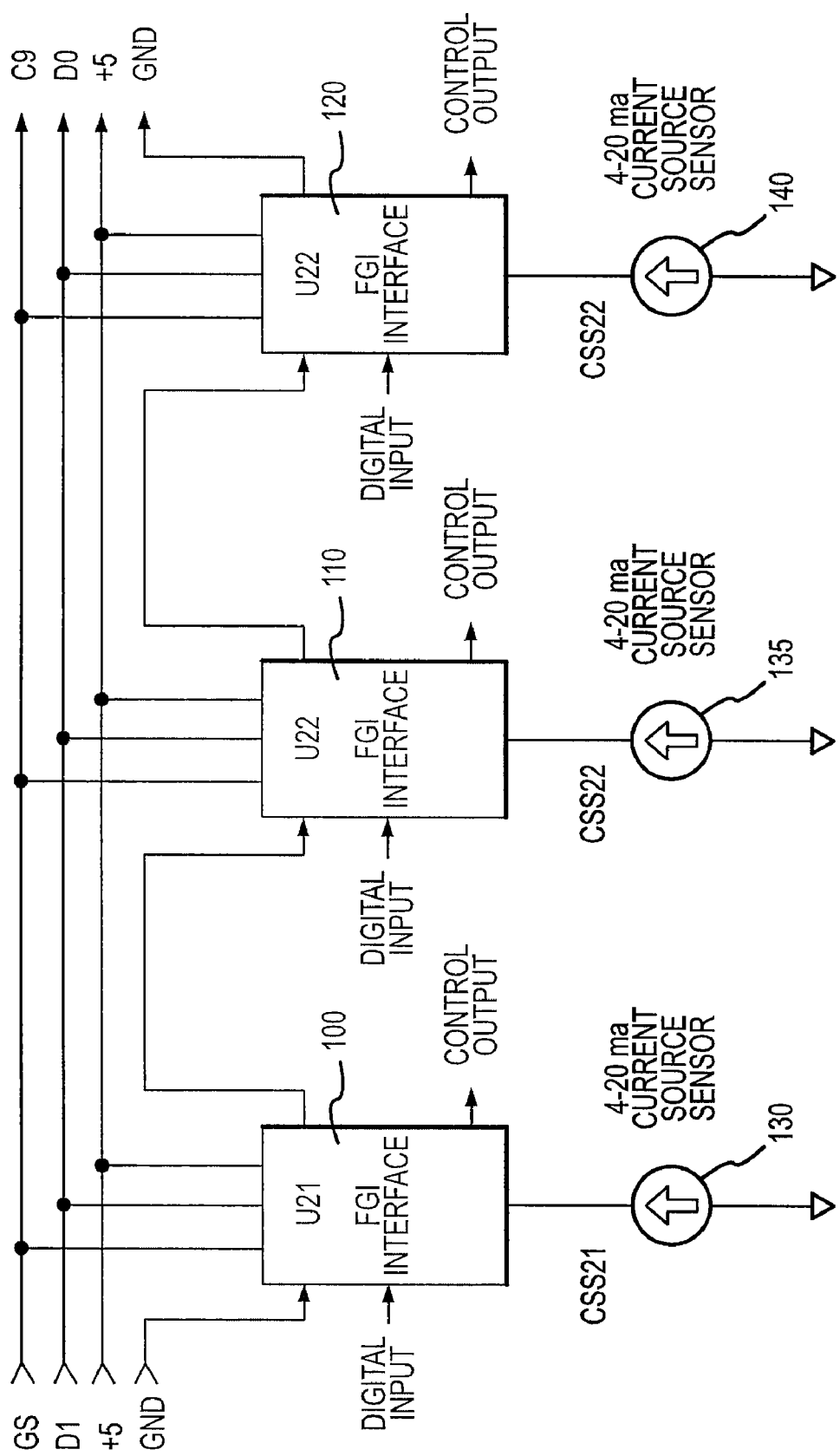
FIG. 2 is a circuit diagram of a daisy-chained switching system.

Switching system devices may be connected to a system controller and interconnected with one another by connecting them sequentially, in a daisy-chain fashion, as shown in FIG. 2. Switching system devices in FIG. 2, and in several of the subsequent figures, are referred to as FGI Interface devices or data bus interface devices or data bus interface chips.

As shown in FIG. 2, a plurality of switching system devices 100, 110 and 120 are adapted to support analog and/or digital devices, and may be sensor input devices and/or control output devices. Digital input signals are supplied directly to the switching system devices, where they are internally converted to output current levels for communication to the controller. Analog input signals are converted into 4–20 ma current signals in a plurality of current source sensors 130, 135 and 140. Switching system devices 100, 110 and 120 gate the signals onto the communication line at appropriate times to send the measurement values to a controller (not shown).

Figure 3:
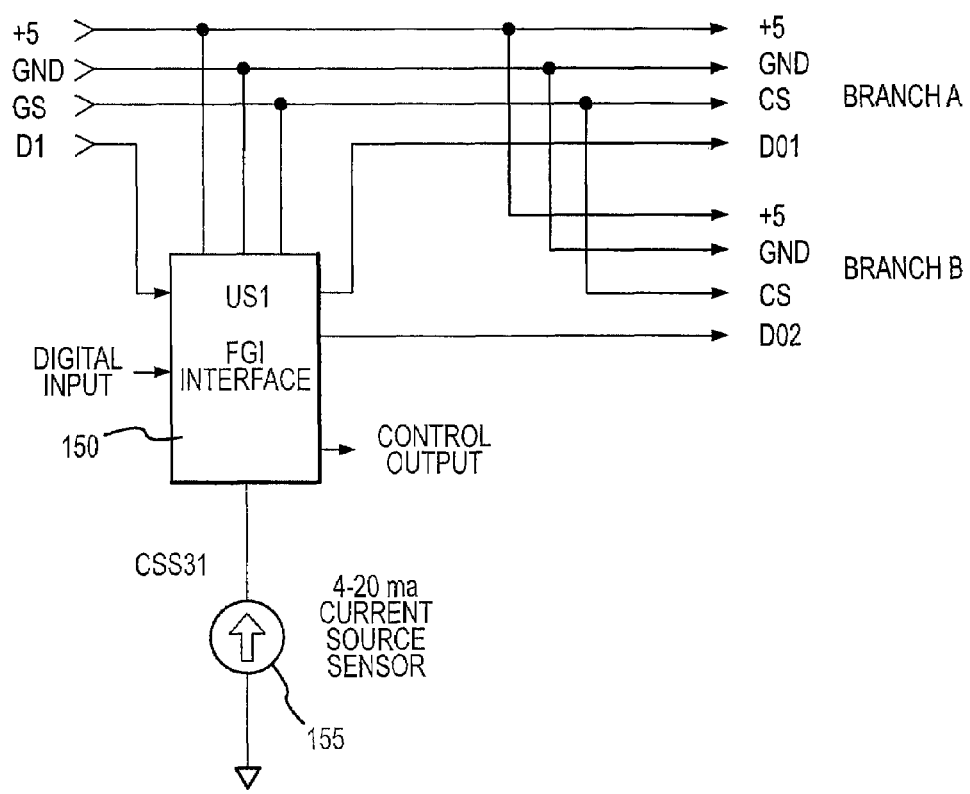
FIG. 3 is circuit diagram of a branching connection switching system.

Switching system devices may optionally be connected to the system controller and interconnected with each other by connecting them in a branching configuration, as shown in FIG. 3. Branching circuitry can be implemented to provide two or more branch outputs, each of which can be connected to the input signals of other switching system devices. In FIG. 3, a switching system device 150 and a current source sensor 155 perform similar functions as those shown in FIG. 2, with the addition of the branched output capability. Sequential and branching interconnections can be arbitrarily intermixed, producing an arbitrarily branched tree wiring topology.

Figure 4:
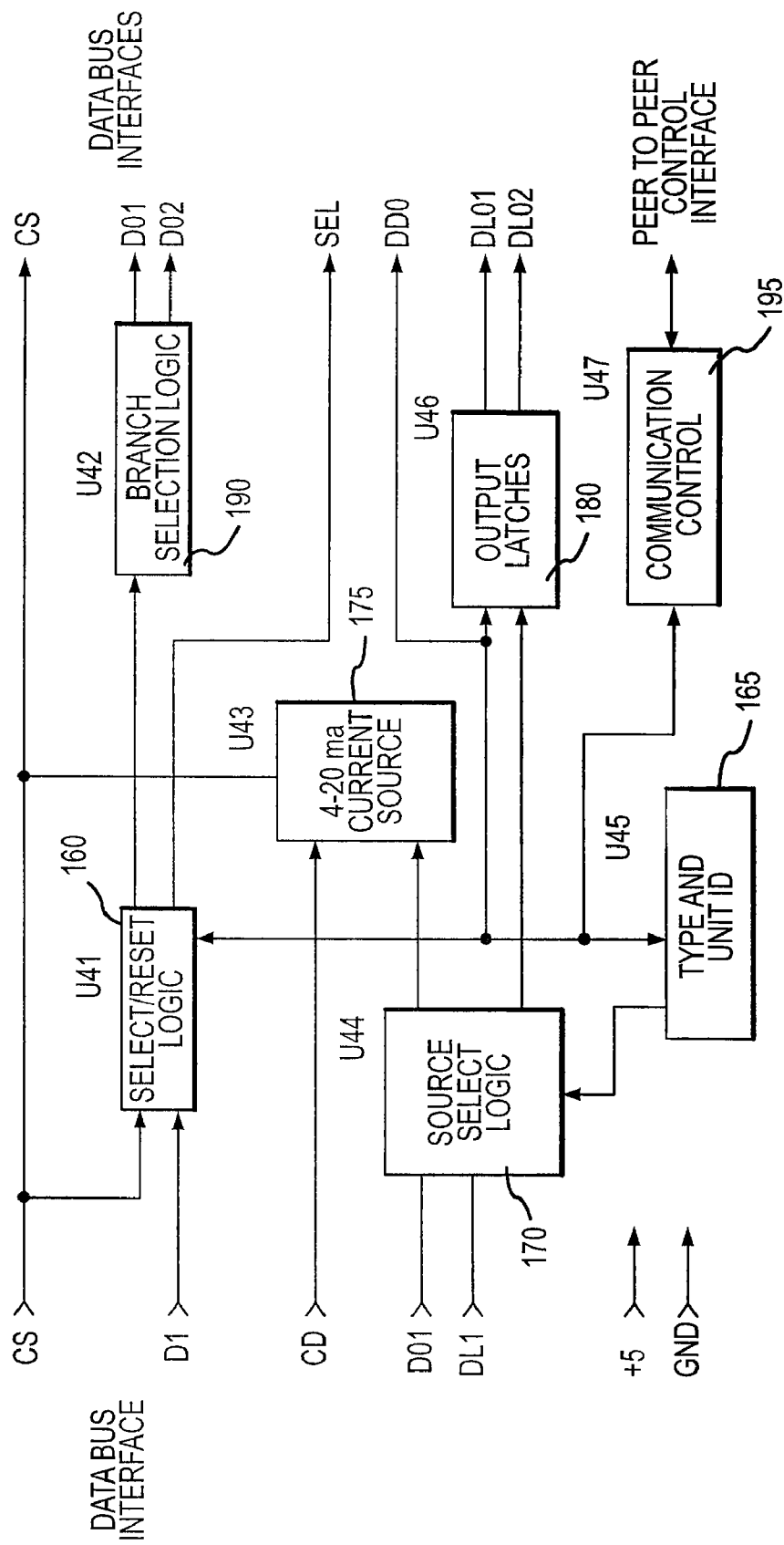
FIG. 4 is a circuit diagram of switching system device logic system.

FIG. 4 shows a block diagram of a logic implementation of one embodiment of a switching system device. In this figure, a select/reset logic 160 decodes the clock signal on the CS line and the controller state/data signal on the DI line, and uses them to determine the current selection state, reset state, and operational phase of the device. If the device is selected for the first time after reset, a Type and Unit ID circuitry 165 is enabled by a source select logic circuitry 170, allowing the type and unit identification bits to be encoded and sent to a system controller via a current level signal generated by a 4 to 20 milliamp current source circuit 175.

When subsequently selected, source select logic circuitry 170 enables the device to send a 4 to 20 milliamp analog input value from the CD line to a system controller. In the alternative, a digital input from the DDI or DLI input is converted into a 4 to 20 milliamp signal for delivery, depending upon whether the device is configured as a digital or analog device type.

Control output signals are latched and output to attached circuit elements by an output latches block 180.

A branch selection logic 190 implements selection branching when enabled. In this manner, device control is passed from switching device to interconnected switching device. Branch selection is determined from state signals sent from the controller during a branch selection operational phase prior to a controller selection cycle.

A communications control circuitry 195 implements optional peer-to-peer communications modes in switching devices with attached microprocessor elements. Three levels of microprocessor communications may be implemented. First, a master-slave for simplest and lowest production cost device implementations. Second, a peer-to-peer receive with master-slave transmit for quick receive response and intermediate cost device implementations. Finally, a full peer-to-peer communications support for high performance device requirements.

Although not shown in FIG. 4, an interface control block may be added to the switching system device logic example to implement protocol bridge devices.

The switching system device logic can be easily connected directly to sensor inputs and control outputs, and/or combined with standard sensor and logic integrated circuits or devices, enabling sensor and control devices to be implemented with a minimum component count. As such, device size, weight and power consumption can be minimized, and device reliability maximized.

Examples of simple and complex device implementations, including both digital and analog sensor device implementations, are discussed in the following figures.

Figure 5:
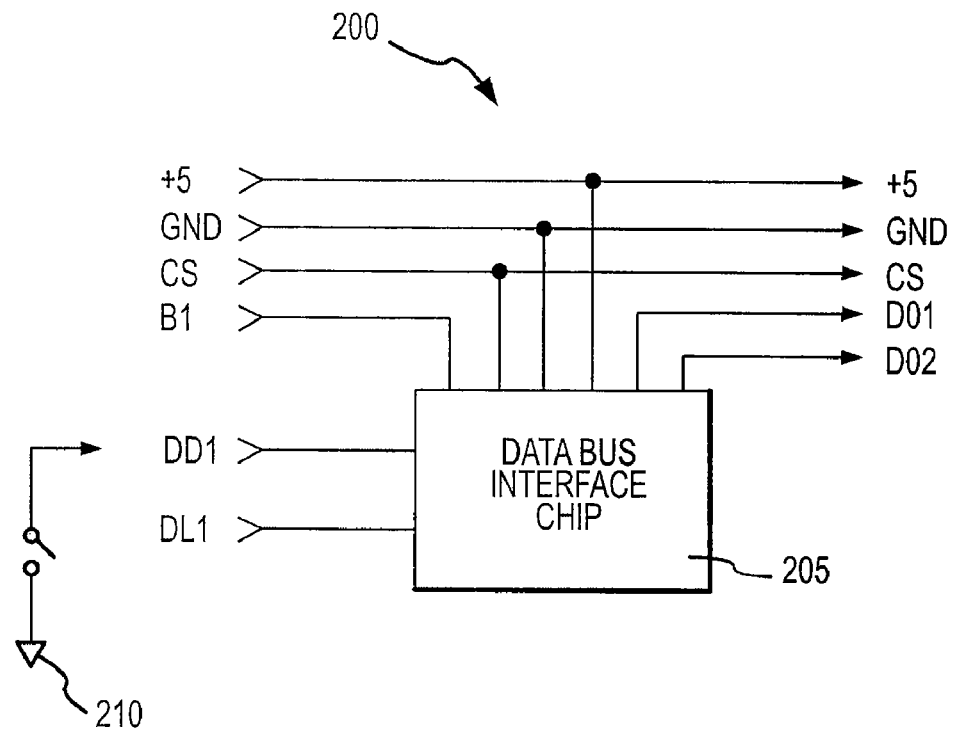
FIG. 5 is a circuit diagram of a switch or logic level state sensor device.

FIG. 5 shows one example of a switch or logic level state sensor device 200. Device 200 requires only a switching device interface circuit 205 and, in some cases, a power supply bypass capacitor. For level sensing, a switch input 210, or monitored logic level signal, is connected to the DDI input. DDI has an internal pull-up, so may be switched to ground with no other external component. For edge or pulse detection, the monitored signal is connected to the DLI input.

Figure 6:
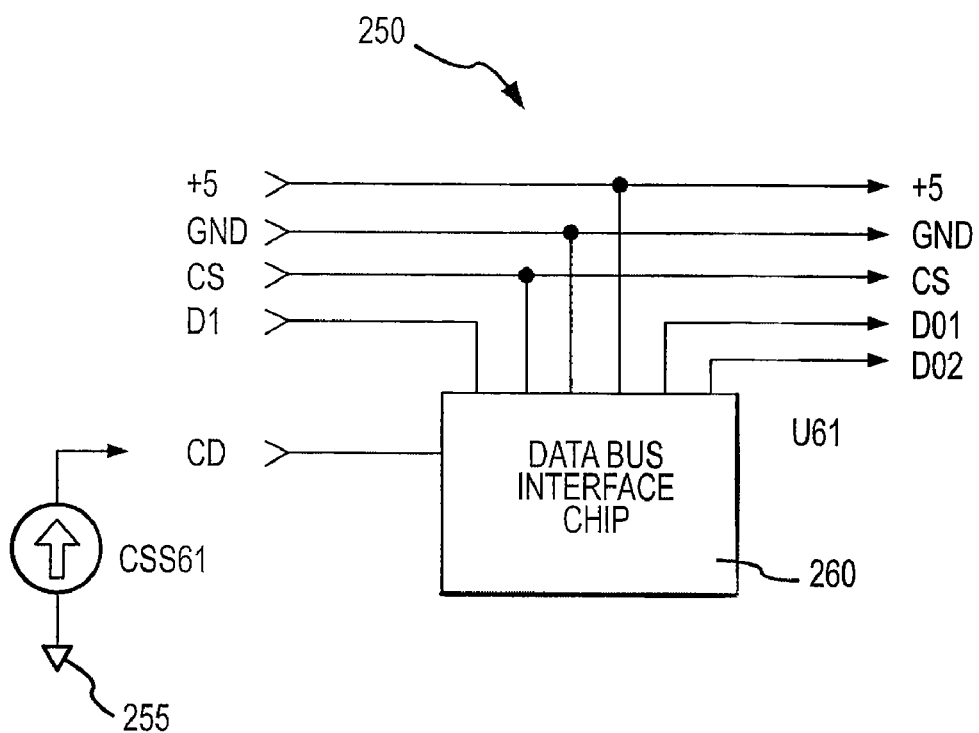
FIG. 6 is circuit diagram of an analog sensor device.

FIG. 6 illustrates an analog sensor device 250. Any analog sensor 255 that produces a 4–20 milliamp output can be connected directly to a switching system interface chip 260, using the CD input pin. Measurement currents will only be drawn while the device is selected. For analog signal level measurements of other signal types, a current source chip such as the National LM334 can be used to convert the input to an appropriate current value.

Figure 7:
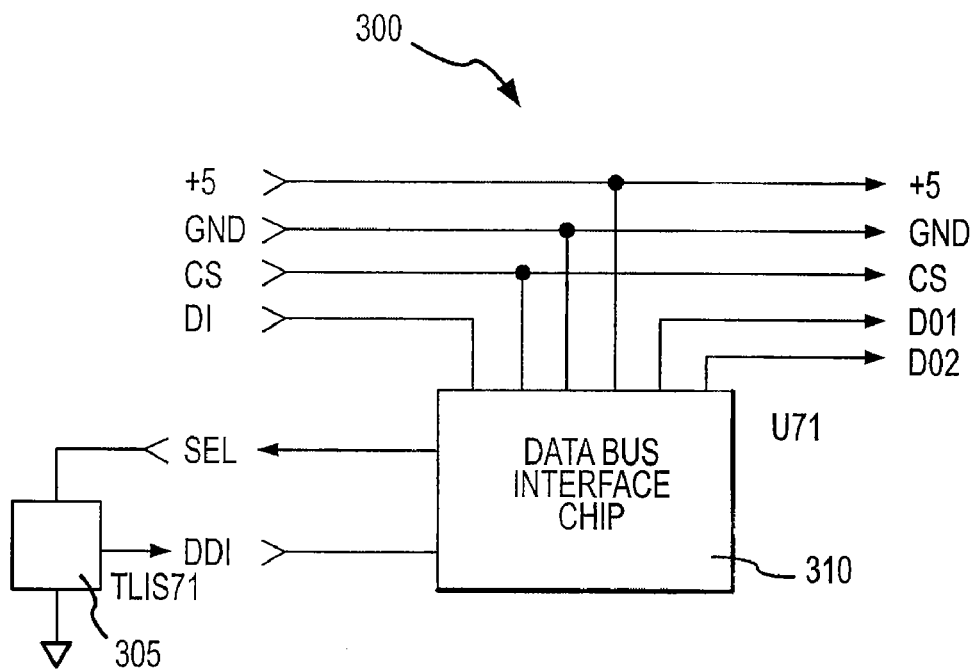
FIG. 7 is a circuit diagram of a thermal or light intensity sensor device.

FIG. 7 shows a thermal or light intensity sensor device 300. A measurement sensor chip 305 produces a square wave output, with the frequency or pulse width dependent upon the temperature or light intensity present. This output drives the DDI input on a switching system interface chip 310 modulating the 4–20 milliamp CS line accordingly, which is measured and converted to a numeric temperature or light intensity value by the interface controller. The measurement chip is powered from the device selected SEL line, so uses power only when the device is selected for measurement.

Figure 8:
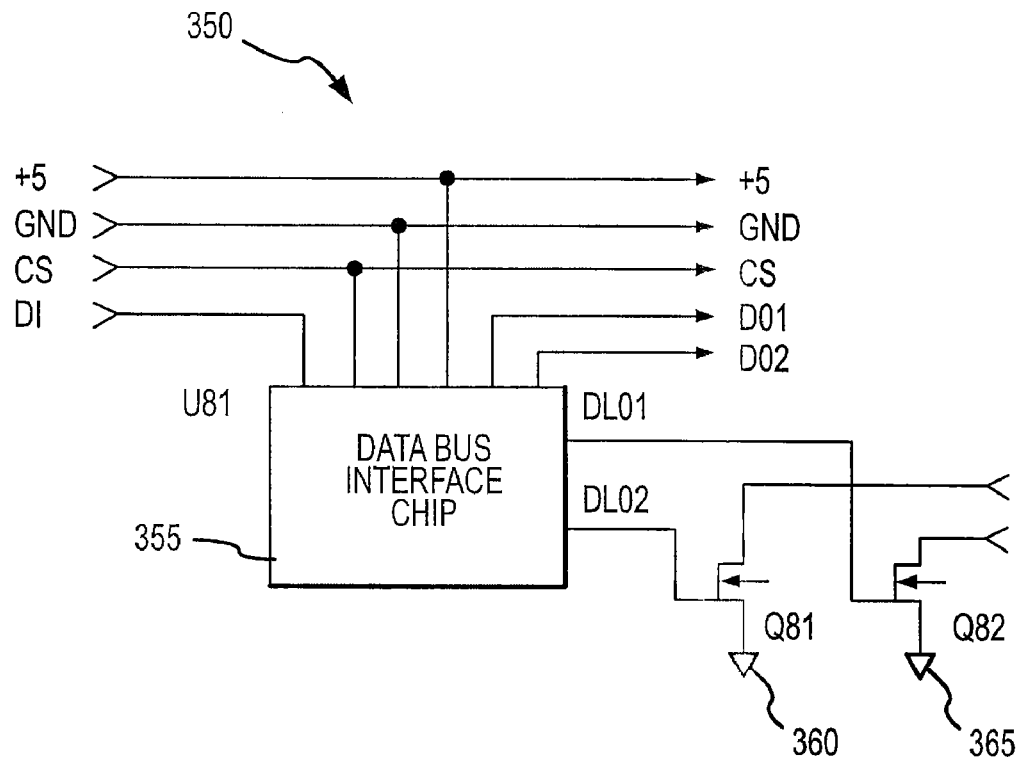
FIG. 8 is a circuit diagram of a power driver control device.

FIG. 8 illustrates a power driver control device 350. A switching system interface chip 355 provides two latched logic level outputs DLO1 and DLO2, which may be used directly as level signals or to sink up to 20 milliamps. They may be connected to a plurality of external FET's 360, 365 or transistors to drive higher power DC loads, or to conventional or optically isolated triacs to drive AC loads. Reset states can be preset to either polarity as needed to achieve glitch-free reset behavior.

Figure 9:
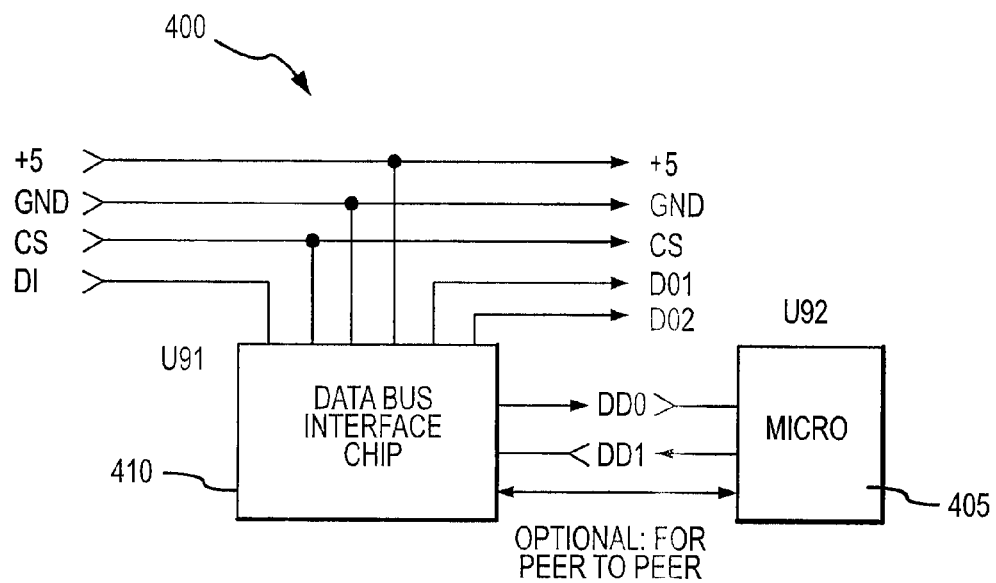
FIG. 9 is a microprocessor based device in accordance with another aspect of the present invention.

FIG. 9 shows a microprocessor based device 400. For higher complexity devices, beyond simple measurement and control, microcontroller or microprocessor based device nodes are often desirable. Communication with a microprocessor device 405 is achieved by connecting two of its I/O pins to a switching system interface device 410 pins DDO (for receive data) and DDI (for transmit data). A standard packet protocol is used for microprocessor device communication.

Packets may be received from the DDO line only when interface device 410 is selected, or continuously, as selected by microprocessor 405. This allows microprocessor 405 to put itself into a power conserving state when the device is not active, if appropriate. Similarly, data transmission may be enabled only when the device is selected, resulting in the simplest device implementations, in which case microprocessor 405 can request service or transmit bus access when deselected by asserting a logic level on the interface chip DDI line. Alternatively, packet transmission may be activated spontaneously by microprocessor 405, with an interference avoidance and collision detection algorithm ensuring communications integrity.

Simple microprocessor based devices may be implemented inexpensively and with fewer component requirements by accepting the restriction that they communicate only when selected in master-slave mode. In commercial quality, such devices might use an inexpensive microcontroller chip, with perhaps 1 K of ROM and 64 bytes of RAM, in an 8 to 20 pin package, needing no additional support components except as needed for the I/O requirements of the particular device type. These devices may also be designed for minimum power usage, with the microprocessor not needing to monitor communications to determine if messages are addressed to it.

Moderate complexity microprocessor based devices can be implemented which can receive peer-to-peer messages at any time, but must adhere to the restriction that they send messages only when selected in master-slave mode. These devices can also be implemented inexpensively, but require an additional small amount of memory for message address decoding instructions, and will consume more power since all communications will need to be monitored.

Higher complexity microprocessor based devices can be implemented to support full peer-to-peer communications, sending and receiving packets when needed. These devices will need more processor resources, and use more complex, though possibly standardized, communications software.

Figure 10:
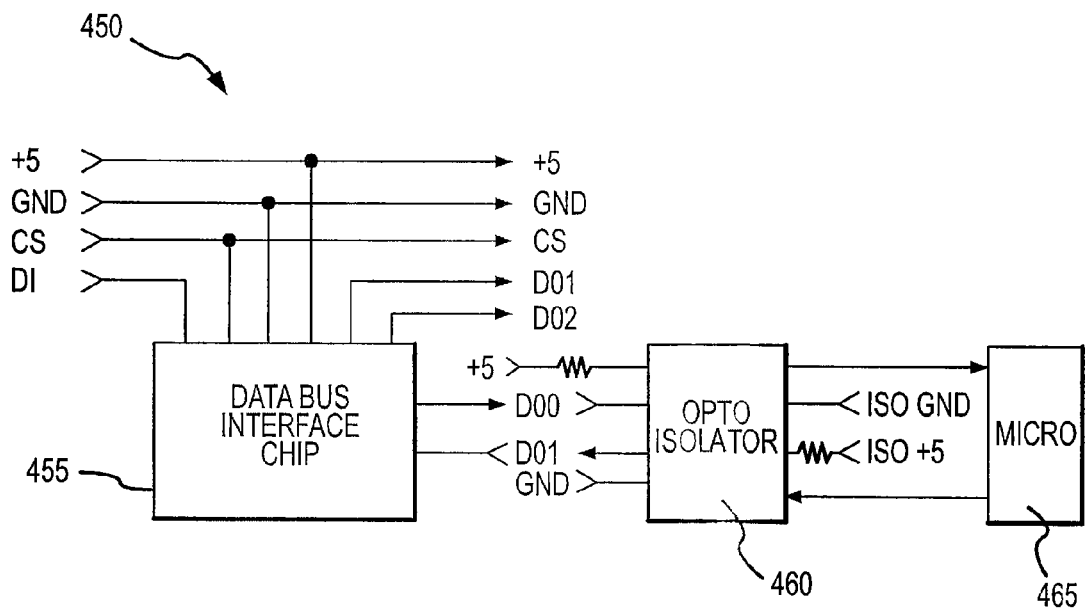
FIG. 10 is a microprocessor based device with optical isolation in accordance with another aspect of the present invention.

FIG. 10 illustrates a microprocessor based device with optical isolation 450. A switching system interface circuit 455 directly supports packet communication with optically isolated devices via the DDI and DDO lines connected to an optical isolator device 460. The other side of the optical isolator can be connected to another circuit as desired, shown here as connected for optically isolated communication with a microprocessor 465. Microprocessor 465 is typically connected to additional signal interface and/or control circuitry.

The simplicity of the switching system interface design makes it easy to integrate on-chip with either analog or digital technology component designs. It could be added to sensor devices such as temperature and light intensity sensor chips, or integrated into microprocessor designs as a communications port option. Integration with sensor and microprocessor designs will produce sensor and control devices with reduced component count, decreased size and power requirements, improved reliability due to fewer interconnections, and reduce recurring production costs.

Figure 11:
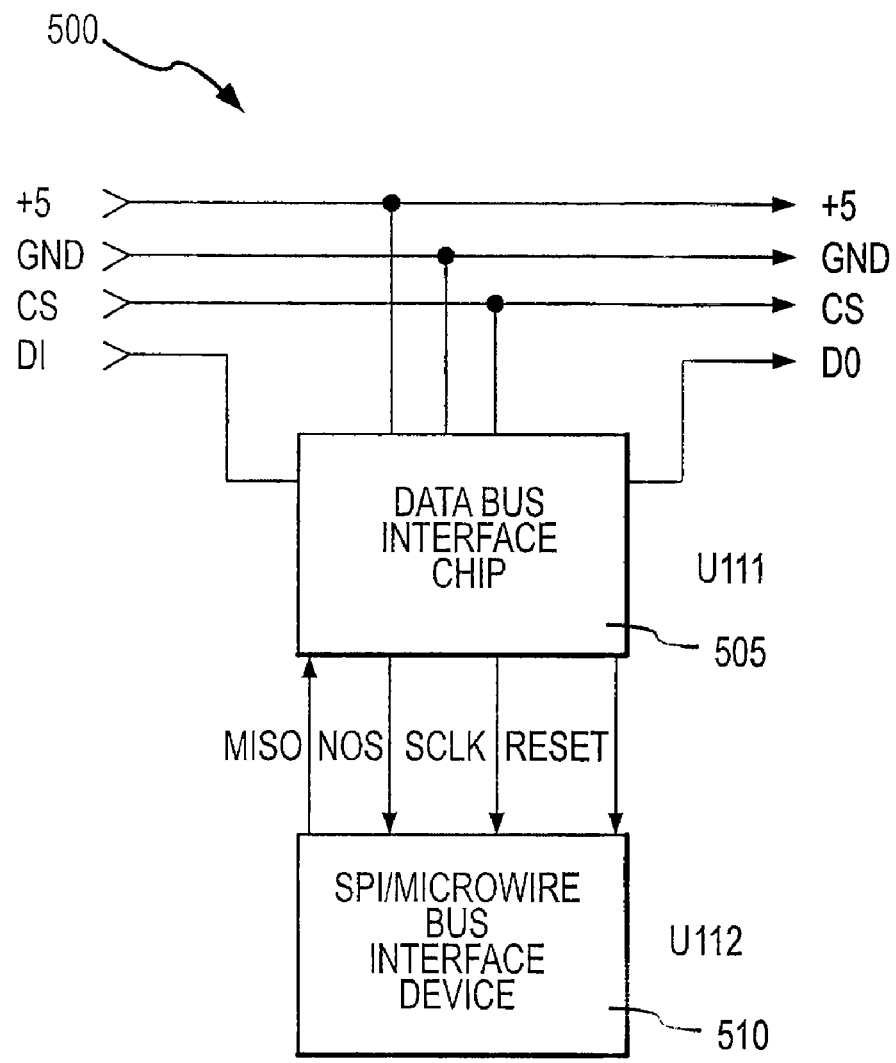
FIG. 11 is a switching system interface implemented with bridge capabilities in accordance with another aspect of the present invention.

A switching system interface 500 may be implemented with bridge capabilities, as shown in FIG. 11, to provide support for local connection of devices with other types of interfaces such as SPI and I2C. This can be used to implement switching system compatible devices with features provided by other off-the-shelf passive components, such as a video switch matrix, or to provide SPI or I2C interconnection to a microcontroller to implement a means of loading software into a remote device without the device microcontroller software needing to participate in the programming process. In this example, a switching system interface circuit 505 is connected to control an SPI interface device 510.

A switching system controller, or more than one for redundant and/or distributed control configuration, can be connected to one or more switching system devices to form a complete switching system. Such systems can be used to implement many different configurations, including distributed sensor and control systems. Possible applications include home and commercial building automation systems, security systems, temperature and humidity monitoring systems, industrial and commercial lighting systems, industrial automation, process control, robotics systems, agricultural monitoring systems, distributed ultrasound transducer systems, and many other applications.

Figure 12:
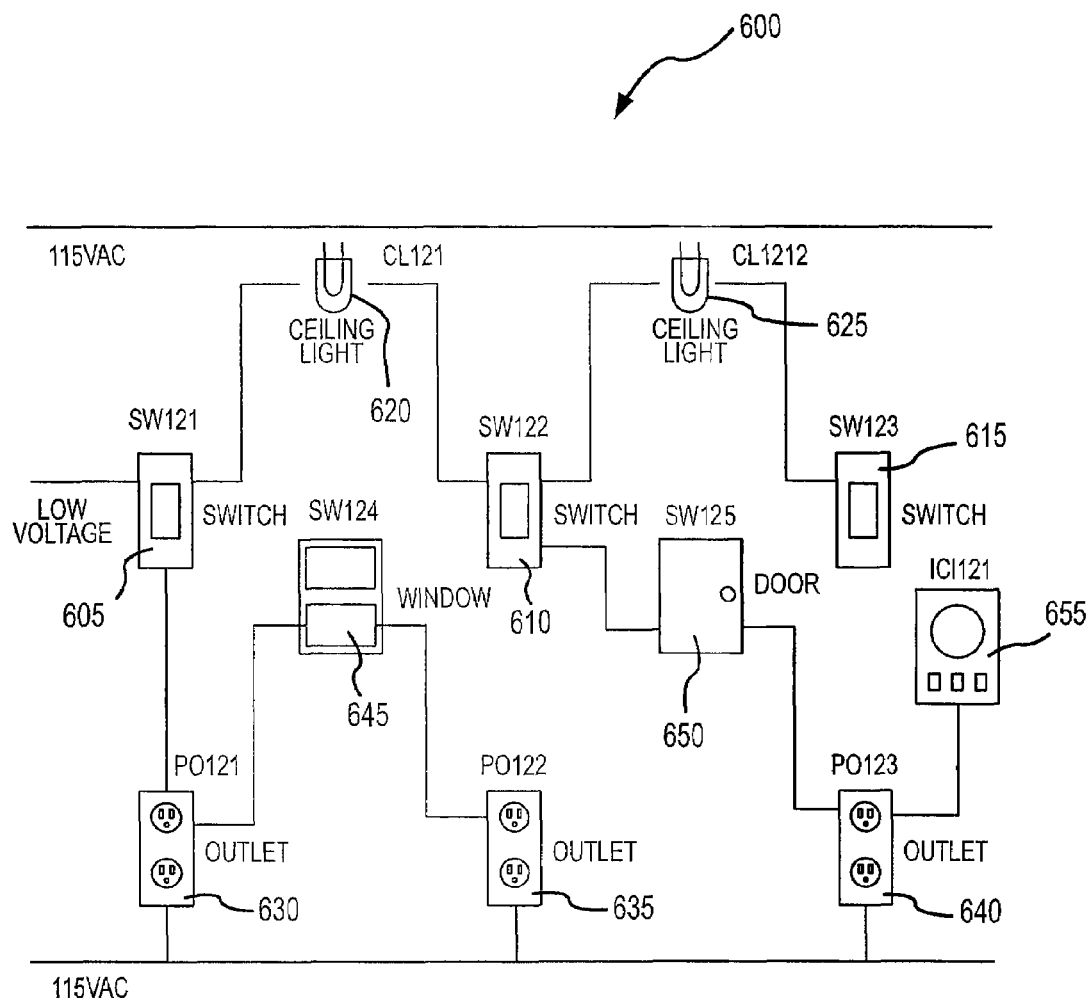
FIG. 12 is a switching system device wiring example in accordance with another aspect of the present invention.

In the switching system wiring example shown in FIG. 12, switching system controller (not shown) communicates with switching system devices via the "Low Voltage" connection shown on the left. A plurality of light switches 605, 610 and 615, ceiling lights 620, 625, power outlets 630, 635 and 640, window and door security switches 645, 650, and an intercom 655 control states are communicated to the system controller via the switching system device networking interface technology, and the controller sets the output states, including power on/off, light dimmer levels, and intercom control states to the appropriate devices. Unlike with the traditional building wiring approach, high voltage power needs to be provided only to the power consuming devices such as outlets and overhead lights, and light switches are only connected to the low voltage switching system signals. Note that with the switching system branching feature, the wiring topology is that of a tree structure, with possible branches at any point, as shown with left switch 605 and center switch 610 connections.

The invention has now been described in detail for purposes of clarity and understanding. However, it will be appreciated that certain changes and modifications may be practiced within the scope of the appended claims.

What is claimed is:

1. A method for communicating with a plurality of remote devices comprising:
   providing state control information from a controller;
   providing a device state condition to a device from an interconnected device, wherein the state of the device is dependent upon a state of the interconnected device combined with the state control information; and providing a system communication signal from the controller from which the interconnected device derives a derived clock signal.

2. The method of claim 1 further comprising:

providing an interconnected device state to a device at a first edge of a clock line pulse; and providing a controller supplied state to the device at a second edge of the clock line pulse.

3. The method of claim 1 wherein a device state transition occurs at the first edge of the clock line pulse.

4. The method of claim 1 wherein device state condition comprises either sensor and external control data communication or internal device control communication.

5. The method of claim 1 further comprising a multi-phase operation, wherein a phase of the multi-phase operation is adapted to provide interconnected device communication.

6. The method of claim 1 further comprising a multi-phase operation, wherein a phase of the multi-phase operation is adapted to provide non-selected device communication.

7. A method for communicating with a plurality of remote devices comprising:

providing state control information from a controller;

providing a device state condition to a device from an interconnected device, wherein the state of the device is dependent upon a state of the interconnected device combined with the state control information;

applying a first controller supplied state to a device on a first edge of a clock line pulse; and applying either an interconnected device state or a second controller supplied state to the device on a second edge of the clock line pulse, wherein the interconnected device state or the second controller supplied state is dependent upon the characteristics of the first controller supplied state.

8. The method of claim 7 wherein the first controller supplied state and either the second controller supplied state or the interconnected device state is applied during a single phase of the clock line pulse.

9. The method of claim 7 wherein the interconnected device state is applied to a first device at a first moment in time and the interconnected device state is applied to a second device at a second moment in time.

10. A method for communicating with a plurality of remote devices comprising:

providing state control information from a controller; and providing a device state condition to a device from an interconnected device, wherein the state of the device is dependent upon a state of the interconnected device combined with the state control information, and device identification information is supplied to the controller during the provision of the state condition to the device.

11. A method for communicating with a plurality of remote devices comprising:

providing state control information from a controller;

providing a device state condition to a device from an interconnected device, wherein the state of the device is dependent upon a state of the interconnected device combined with the state control information; and a multi-phase operation, wherein a phase of the multi-phase operation is adapted to provide sensor and external control data communication with a selected device.

12. A switching system comprising:

a switching system controller, wherein the controller is adapted to provide state control information; and a switching system device, wherein the switching system device is adapted to receive a device state condition from an interconnected device and wherein the state of the switching system device is dependent upon a state of the interconnected device combined with the state control information, and the interconnected device is further adapted to derive a derived clock signal from a system communication signal.

* * * * *